Jan. 3, 1967 D. B. OWINGS 3,295,166
APPARATUS FOR EXTRUDING POLYTETRAFLUOROETHYLENE
TUBING AND WIRE COATING
Filed July 24, 1963 2 Sheets-Sheet 2

INVENTOR
DONALD BOYD OWINGS

BY *Albert C. Hodgson*

AGENT

APPARATUS FOR EXTRUDING POLYTETRAFLUOROETHYLENE TUBING AND WIRE COATING

Donald Boyd Owings, Wilmington, Del., assignor to E. I. du Pont de Nemours and Company, Wilmington, Del., a corporation of Delaware
Filed July 24, 1963, Ser. No. 297,442
6 Claims. (Cl. 18—13)

This invention relates to the production of thin-walled tubing of polytetrafluoroethylene having unusually high strength properties, and more particularly to an apparatus for producing such tubing.

Polytetrafluoroethylene resins possess unique chemical and physical properties which make them particularly well suited for many applications. Among these characteristics are high mechanical strength and resistance to abrasion, inertness to almost all chemical solvents, outstanding dielectric properties and usefulness over a wide temperature range, e.g., from —420 to 500° F.

Because of the aforementioned properties, polytetrafluoroethylene resin tubing has found application particularly as pipe and pipe liners and as a wire coating. In the case of the wire coating, the tubing is extruded directly onto the wire.

One of the major problems in the past has been to produce a smooth tubing of uniform thickness and free of flaws or voids. This has been a particularly serious problem in the manufacture of polytetrafluoroethylene coated wire since the useable length of a piece of wire would be limited by any flaws or voids in the coating.

A further problem which has existed previously in producing polytetrafluoroethylene resin tubing by extrusion was that the length of the tubing was limited by the size of the charging chamber on the extrusion machine. Heretofore, it has not been possible to use multiple charges in extruding polytetrafluoroethylene tubing because of the high number of flaws occurring at the junction point of the multiple charges.

It is an object of this invention to provide an apparatus capable of producing a smooth, substantially flawless, uniform polytetrafluoroethylene tubing having a higher mechanical strength and toughness than has been obtainable in the past.

It is a further object of this invention to provide an apparatus capable of producing an improved polytetrafluoroethylene wire coating, substantially free of flaws and possessing higher mechanical strength and toughness than has been obtainable in the past.

It is still a further object of this invention to provide an apparatus capable of producing relatively flawless polytetrafluoroethylene tubing of unlimited length and to produce a polytetrafluoroethylene coated wire with a relatively flawless coating and limited in length only by the length of the wire.

Figure 1:
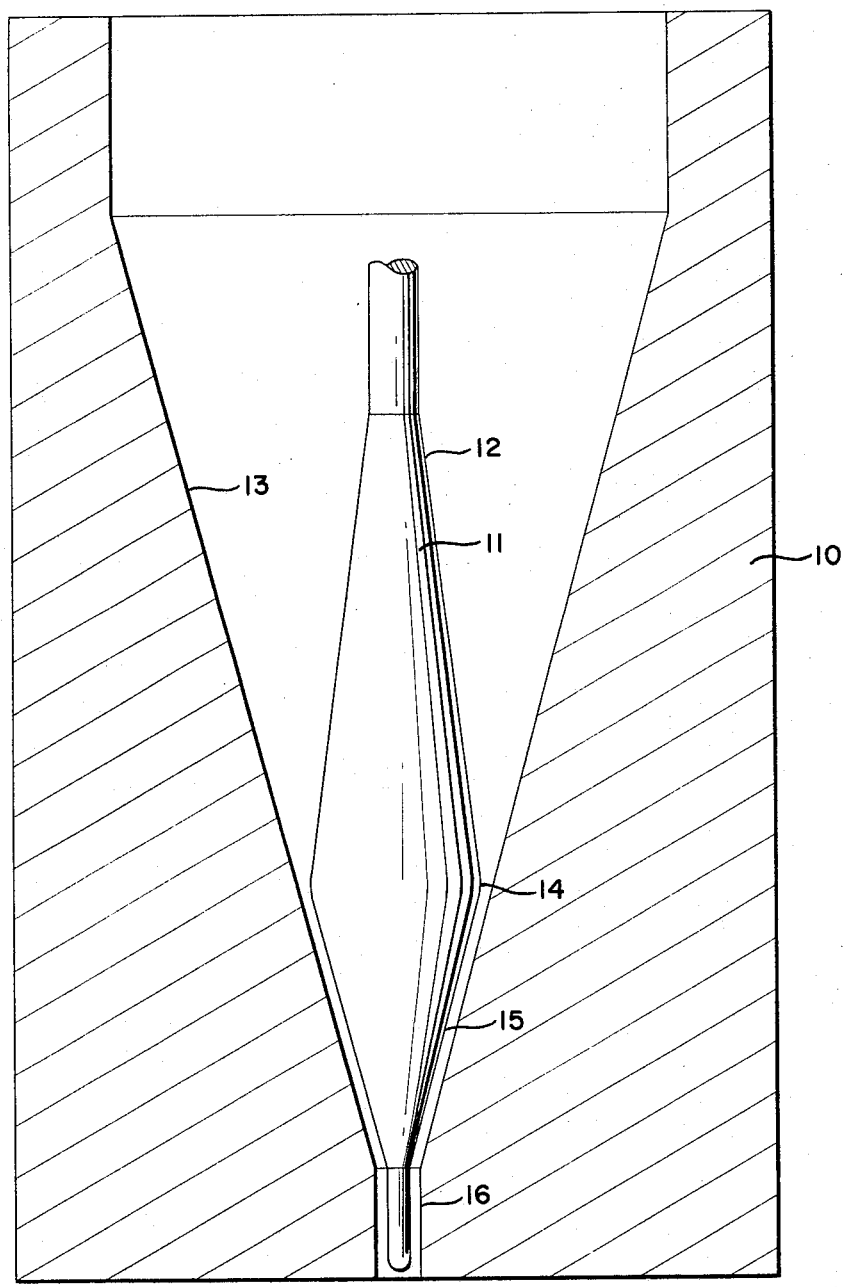
Figure 2:
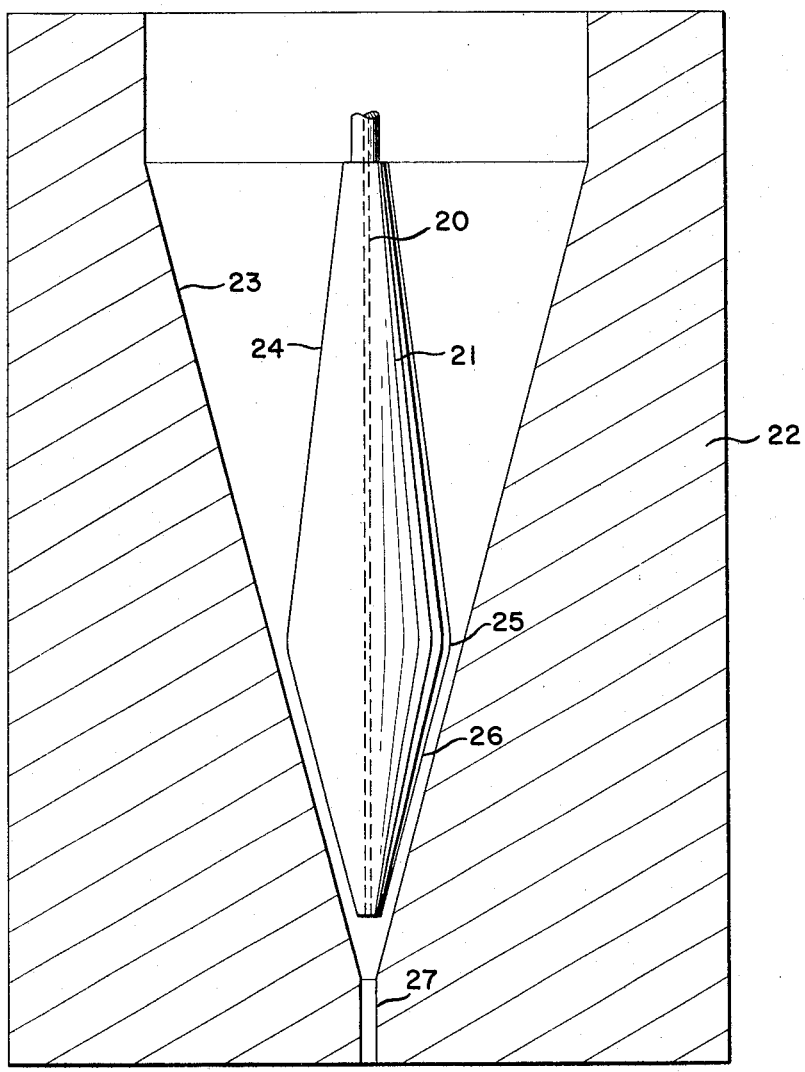

These and other objects of this invention will be apparent to those skilled in the art from the following description and examples and the drawings in which FIG. 1 is a cross-sectional view of a tubing, extrusion die and mandrel of the present invention, and FIG. 2 is a cross-sectional view of a wire coating die and guide tip of the present invention.

In a multiple charge system for producing polytetrafluoroethylene tubing, a charge of resin is introduced into the charging chamber of an extrusion machine such as that disclosed in United States Patent No. 2,825,091, issued March 4, 1958. The piston of the machine is then caused to extrude tubing through a die and around a mandrel until only a predetermined amount of the resin remains in the charging chamber. The piston is then withdrawn, a new charge is introduced, and the cycle is repeated. In extruding a wire coating, a similar operation is performed with the wire acting as the mandrel.

One of the inherent difficulties with this type of operation in the past has been the high tendency for flaws, voids and irregularities to occur at the junction point of two successive charges.

It has now been discovered that a particular configuration of a die and mandrel combination will result in biaxial orientation of the molecules of polytetrafluoroethylene resin extruded therethrough, resulting in a tubing having remarkably higher mechanical strength and toughness than previously obtainable. It was also discovered that this orientation obtained through a unique working of the charges resulted in tubing and wire coatings having a surprisingly few flaws, voids or irregularities, not only throughout a single charge, but also throughout the junction of successive charges.

The unique working of the present invention is carried out in the following manner.

(a) A charge of commercially available polytetrafluoroethylene fine powder, premixed with a suitable lubricant to form a paste, is placed in the charging chamber of an extrusion machine and hydraulic pressure is applied to the piston thereof.

(b) The charge, under pressure, is directed into a die 10 having a conically decreasing internal surface 13.

(c) In the die 10, the charge initially contacts the diverging portion 12 of a bulbous guide tip 11 positioned therein in such a way that the diverging and converging areas of said bulbous guide tip are contained within the converging area 13 of said die, causing an initial compacting of the advancing charge between the converging internal surface 13 of the die and the diverging external surface 12 of the guide tip.

(d) By the time the charge has advanced to the point of maximum diameter 14 of the guide tip 11, at which point the converging and diverging portions of said guide tip are joined by a smoothly blending, intermediate area, the charge has been steadily reduced in cross-sectional surface area and the internal diameter has been steadily increased while the external diameter has been steadily decreased. Thus, the wall thickness of the charge has been steadily decreased.

(e) As the charge travels past the converging portion 15 of the guide tip, which has an angle of convergence approximately equal to the angle of convergence of the interior wall 13 of the die, the cross-sectional area of the charge is reduced while the wall thickness remains constant. Accordingly, the charge, which has assumed the shape of a tube, receives compressive force with components both parallel and normal to the angle of convergence of the die and guide tip.

(f) As the charge reaches the top of the land 16, it has assumed its approximate final diameter. It then passes into the land 16 of the die where any irregularities in the surface thereof are removed.

(g) The finished, unsintered or "green" tube is then subjected to a temperature of 360 to 440° C. for a period of 0.5 to 5 minutes to sinter it.

The resulting product has remarkably high strength and resistance to abrasion. It is chemically inert and is impervious to almost any solvent or corrosive chemical.

In the application of the present invention to wire coating (FIG. 2), the procedure is as follows:

(a) A charge of commercially available polytetrafluoroethylene fine powder, premixed with a suitable solvent to form a paste, is placed in the charging chamber of an extrusion machine and hydraulic pressure is applied to the piston thereof. The polytetrafluoroethylene charge may contain a filler such as mica in particulate form which will improve the insulating properties of the resulting wire coating.

(b) The wire to be coated is fed into the extrusion machine and through a hollow cavity 20 in the guide tip 21.

(c) The charge, under pressure, is directed into a die 22 having a conically decreasing internal surface 23.

(d) In the die 22, the charge contacts the diverging portion 24 of the bulbous guide tip 21 positioned therein, causing an initial compacting of the advancing charge between the converging internal surface 23 of the die and the diverging surface 24 of the guide tip 21, the diverging and converging areas of said bulbous guide tip being contained within the converging area 13 of said die.

(e) By the time the charge has advanced to the point of maximum diameter 25 of the guide tip 21, at which point the converging and diverging portions of said guide tip are joined by a smoothly blending, intermediate area, the charge has been steadily reduced in cross-sectional surface area and the internal diameter has been steadily increased, while the external diameter has been steadily decreased. Thus, the wall thickness of the charge has been steadily decreased.

(f) As the charge travels past the converging portion 26 of the guide tip 11, which has the angle of convergence approximately equal to the angle of convergence of the interior wall 23 of the die 22, the cross-sectional area of the charge is reduced while the wall thickness remains constant. Accordingly, the charge which has assumed a tubular shape receives compressive force with components both parallel and normal to the angle of convergence of the die and guide tip.

(g) As the charge reaches the top of the land 27, it has assumed its approximate final diameter. It then is united to the wire passing through the hollow channel 20 of the guide tip 21. The coated wire then passes through the land 27 of the die 22 where any irregularities in the surface of the coating are removed.

(h) The completed, unsintered, coated wire is then subjected to a temperature of 360 to 440° C. for a period of 0.5 to 5 minutes for the purpose of sintering.

It has been determined that the perpendicular distance between the guide tip and the interior wall of the die is a critical factor in the extrusion of tubing and wire coating. If the distance is too great, the necessary amount of working will not take place, resulting in a non-uniform product, and if the distance is too small, the resultant wall thickness will be too small, resulting in a substandard product. The perpendicular distance between the converging portion of the guide tip and the interior wall of the die should be from five to fifteen times the desired wall thickness of the resultant tube or wire coating.

The bulbous guide tip may be constructed of metal. Additionally, it has been found that the guide tip may be fabricated from a plastic material such as acetal resin which has the surprising quality of being self-centering. The hydrostatic force on the charge is uniformly distributed within the die and coacts with the inherent resiliency of the plastic material to produce a self-centering arrangement.

It was found that the angle of divergence of the guide tip was less critical than the angle of convergence, but that it should be less than 15 degrees. The angle of convergence of both the die and the guide tip must be approximately equal and should be within the range of 10 to 60 degrees, and preferably between 20 and 40 degrees.

It was also determined that the die may be either stationary or rotating. It was further determined that the die may be made in a plurality of sections, one or more of which may rotate to achieve a more smooth surface on the finished article.

The use of bosses on either or both the die and the guide tip was found to result in a more complete working of the polytetrafluoroethylene resin.

I claim:

1. Extrusion apparatus particularly adapted for the production of thin-walled tubing of tetrafluoroethylene resin comprising, in combination, a die having an area of convergence, a bulbous guide tip fixedly secured therein, said bulbous guide tip having an initial area of divergence, an area of convergence at the lower end thereof, said areas being joined by a smoothly blending, intermediate area, said die having an angle of convergence substantially the same as the angle of convergence of said guide tip, said diverging and converging areas of said guide tip being contained within said converging area of said die, said guide tip being spaced from said die a distance of 5 to 15 times the desired wall thickness of the resultant tube.

2. The apparatus of claim 1 in which the guide tip is fabricated of acetal resin.

3. The apparatus of claim 1 in which the angle of convergence of the die and guide tip is between 20 and 40 degrees.

4. The apparatus of claim 1 in which the guide tip is provided with a hollow internal chamber.

5. The apparatus of claim 1 in which the die has a uniform angle of convergence.

6. The apparatus of claim 5 in which the die is provided with a land at the lower portion thereof.

References Cited by the Examiner

UNITED STATES PATENTS

| | | | |
|---|---|---|---|
| 2,501,690 | 3/1950 | Prendergast | 264—209 X |
| 2,752,321 | 6/1956 | Heller | 264—174 X |
| 2,794,213 | 6/1957 | Davis. | |
| 2,810,159 | 10/1957 | Teichmann | 18—13 X |
| 2,963,740 | 12/1960 | Yim. | |
| 3,008,187 | 11/1961 | Slade. | |

ROBERT F. WHITE, *Primary Examiner.*

A. R. NOE, *Assistant Examiner.*